US012695367B2

(12) United States Patent
Huber et al.

(10) Patent No.: US 12,695,367 B2
(45) Date of Patent: Jul. 28, 2026

(54) DEVICE AND SYSTEM FOR CONVERTING MECHANICAL ENERGY INTO ELECTRIC ENERGY

(71) Applicant: REPS-Tirol GmbH, Wattens (AT)

(72) Inventors: Alfons Huber, Innsbruck (AT); Stephan Plattner, Arzl im Pitztal (AT)

(73) Assignee: Reps-Tirol GmbH, Wattens (AT)

( * ) Notice: Subject to any disclaimer, the term of this patent is extended or adjusted under 35 U.S.C. 154(b) by 171 days.

(21) Appl. No.: 18/564,281

(22) PCT Filed: May 25, 2022

(86) PCT No.: PCT/EP2022/064217
§ 371 (c)(1),
(2) Date: Nov. 27, 2023

(87) PCT Pub. No.: WO2022/248559
PCT Pub. Date: Dec. 1, 2022

(65) Prior Publication Data
US 2024/0322662 A1 Sep. 26, 2024

(30) Foreign Application Priority Data
May 26, 2021 (EP) .................................... 21175873

(51) Int. Cl.
*H02K 35/02* (2006.01)
*E01F 11/00* (2006.01)
*F03G 7/08* (2006.01)
(52) U.S. Cl.
CPC .............. *H02K 35/02* (2013.01); *E01F 11/00* (2013.01); *F03G 7/087* (2021.08)

(58) Field of Classification Search
CPC .. F03G 7/00; F03G 7/08; F03G 7/087; H02K 7/00; H02K 7/09; H02K 7/18;
(Continued)

(56) References Cited

U.S. PATENT DOCUMENTS

| 4,239,974 A | 12/1980 | St Pierre |
| 5,347,186 A * | 9/1994 | Konotchick ........... H02K 35/04 |
| | | 322/3 |

(Continued)

FOREIGN PATENT DOCUMENTS

| DE | 1145225 B | 3/1963 |
| KR | 101 958 685 B1 | 3/2019 |

OTHER PUBLICATIONS https://www.supermagnete.at/scheibenmagnete-neodym/scheibenmagnet-45mm-30mm_S-45-30-N ; printed Oct. 23, 2024.

*Primary Examiner* — John E Breene
(74) *Attorney, Agent, or Firm* — Simpson & Simpson, PLLC; Jeffrey B. Powers

(57) ABSTRACT
A device for converting mechanical energy into electric energy. A first magnet is arranged above a second magnet and in a manner movable in the direction of the second magnet. The same poles of the first magnet and the second magnet are aligned with each other. A first coil has windings and an inner space formed by the windings. The first coil receives the first magnet in its inner space during a movement in the direction of the second magnet and generates a corresponding induction voltage. A second coil has windings and an inner space formed by the windings. The second coil is arranged below the first coil and aligned perpendicularly to the first coil. The second coil is arranged at least partially around the second magnet and generates a voltage when the first magnet moves in the direction of the second magnet.

20 Claims, 8 Drawing Sheets

Figure 1A:
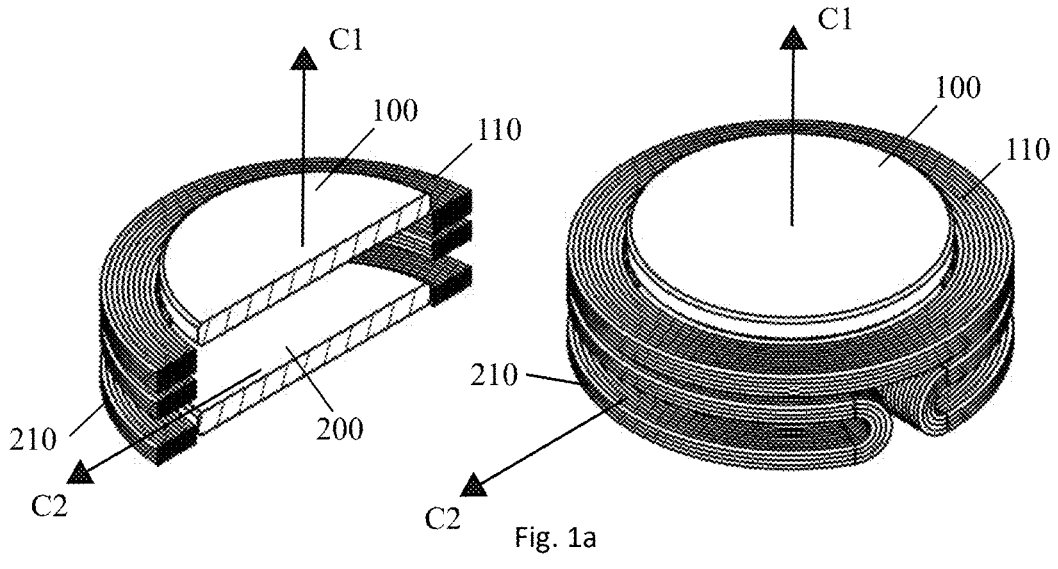

(58) Field of Classification Search
CPC ...... H02K 7/187; H02K 7/1876; H02K 35/00;
H02K 35/02; E01F 11/00
See application file for complete search history.

(56) References Cited

U.S. PATENT DOCUMENTS

| | | | | |
|---|---|---|---|---|
| 5,440,183 | A | * | 8/1995 | Denne ................... F15B 15/088 |
| | | | | 310/12.26 |
| 2007/0257495 | A1 | | 11/2007 | Kim |
| 2013/0033131 | A1 | * | 2/2013 | Kahng ................... H02K 35/02 |
| | | | | 310/36 |
| 2013/0342036 | A1 | | 12/2013 | Akazawa |

* cited by examiner

Length [cm]

Length [cm]

1

DEVICE AND SYSTEM FOR CONVERTING MECHANICAL ENERGY INTO ELECTRIC ENERGY

REFERENCE TO RELATED APPLICATION

This application is a U.S. National Stage filing of International Application PCT/EP2022/064217, filed May 25, 2022, which claims benefit of priority of European Patent Application Number 21175873.5, filed on May 26, 2021, each of which is hereby incorporated by reference herein in its entirety.

The present disclosure relates to devices and systems for converting mechanical energy into electric energy, in particular in flooring systems.

Energy converters for driving on roads (e.g. the highway) have not yet been used in the state of the art. In the state of the art, only energy converters for pedestrians on sidewalks are known, which are operated by dynamos and piezoelectric mechanisms.

DE 11 45 225 B relates to a pulse generator for generating constant electrical pulses in response to predetermined mechanical movements.

U.S. Pat. No. 4,239,974 A relates to a power generation system for generating electric energy and, in particular, to a power generation system that utilizes the otherwise wasted energy of motor vehicles moving on a roadway as a source of energy.

US 2013/342036 A1 relates to a vibration-based power generator attached to a structure, such as a wall surface, a road sign, a vehicle body and a railroad bridge, and generating the electric current from the vibration of the structure.

US 2007/257495 A1 relates to a power generator comprising a generally flat and partially flexible traffic surface on which pedestrians and traffic can pass, wherein a plurality of dynamo cells, each with a dynamo therein, are located beneath the traffic surface.

KR 10-1958685 B1 relates to a power generating device installed on a road.

It is an object of the present disclosure to provide devices and systems which have an improved efficiency compared to known systems in the prior art.

This object is achieved with the features of the independent patent claims. The dependent patent claims relate to further aspects.

According to an aspect of the present disclosure, a device for converting mechanical energy into electric energy for a system, preferably a flooring system, is provided. The device comprises: a first magnet and a second magnet, wherein the first magnet is arranged above the second magnet at a predetermined distance and in a manner movable in the direction of the second magnet, and wherein the same poles of the first magnet and the second magnet are aligned with each other; a first coil having a predetermined number of windings and an inner space formed by the windings, wherein the first coil receives the first magnet in its inner space during a movement in the direction of the second magnet and generates a corresponding induction voltage; a second coil having a predetermined number of windings and an inner space formed by the windings, wherein the second coil is arranged below the first coil and aligned perpendicularly to the first coil, wherein the second coil is arranged at least partially around the second magnet and generates a voltage when the first magnet moves in the direction of the second magnet.

According to a further aspect of the present disclosure, a device for converting mechanical energy into electric energy for a system, preferably a flooring system, is provided. The device comprises: a first magnet and a second magnet, wherein the first magnet is arranged at a predetermined distance from the second magnet and in a manner movable in the direction of the second magnet, and wherein the same poles of the first magnet and the second magnet are aligned with each other; a first coil having a predetermined number of windings and an inner space formed by the windings, wherein the windings of the first coil are wound in substantially parallel planes, wherein the first coil receives the first magnet in its inner space during a movement in the direction of the second magnet and generates a corresponding induction voltage; a second coil having a predetermined number of windings and an inner space formed by the windings, wherein the windings of the second coil are substantially contained in a surface that is perpendicular to the first coil, wherein the second coil is arranged at a predetermined distance in the direction of the second magnet from the first coil, wherein the second coil is arranged at least partially around the second magnet and generates a voltage when the first magnet moves in the direction of the second magnet.

Various embodiments may preferably implement the following features.

The second coil preferably has the shape of an elliptical ring, which is arranged around the second magnet. The two main vertices of the elliptical ring preferably meet at a point in the circumferential direction of the second magnet without touching each other, i.e. the two main vertices of the elliptical ring are at a predetermined distance from each other.

The two main vertices of the elliptical ring preferably lie in a plane parallel to the first and second magnets.

Preferably, one of the secondary vertices of the elliptical ring is arranged above the second magnet and the other secondary vertex of the elliptical ring is arranged below the first secondary vertex (preferably at the level of the second magnet), with above denoting an offset in the direction of the first magnet.

The above geometric designations refer to the use of a first and/or second toroidal coil. The use of a first and/or second toroidal coil is particularly preferred in conjunction with a first and/or second magnet having a cylindrical shape. It will be clear to the person skilled in the art that the corresponding relationships of the coils and magnets to one another apply according to the selected shapes of the magnets and/or coils in equivalent form. For example, if a first and/or second magnet having a rectangular shape is used, a first and/or second coil having a rectangular hollow profile may preferably be used, with the relationships and positions between magnets and coils described above applying accordingly.

The device preferably comprises a first stator, which is arranged on a side of the first magnet facing away from the second magnet, and a second stator, which is arranged on a side of the second magnet facing away from the first magnet.

The first and/or the second magnet preferably has a cylindrical, rectangular, cubic, conical, spherical, or pyramidal shape.

The first and/or the second magnet can be a single magnet, or a magnet made up of several individual magnets.

In one embodiment, the first and/or the second magnet has a cylindrical shape so as not to lose any tappable magnetic field change or surface area in the repulsion coil (second coil).

Preferably, the device further comprises: a first iron element, preferably a first steel element, which is arranged below (on the side facing the second magnet) the first magnet; and a second iron element, preferably a second steel element, which is arranged in the inner space of the second coil.

The first iron element is preferably arranged on the side of the first magnet facing the second magnet, and the first coil preferably receives the first magnet and the first iron element in its inner space during a movement in the direction of the second magnet, the first iron element preferably being flush with the edge of the first magnet.

The first iron element preferably has a ring shape. The second iron element preferably has a ring shape with a gap. As described above, the magnets and coils can have different geometries/shapes. It will be clear to the skilled person that the first and/or second iron element preferably has a corresponding shape.

Preferably, the first and second magnets are aligned with each other in an initial position corresponding to the predetermined distance, preferably exclusively due to the mutual repulsion without external force.

The first and second magnets are preferably adapted to move the first magnet in the direction of the second magnet when an external force is applied.

The first and second magnets are preferably adapted to return to their initial position after an external force is applied, preferably exclusively due to the mutual repulsion.

The device preferably further comprises: a first plate element disposed on a side of the first magnet facing away from the second magnet, and a second plate element disposed on a side of the second magnet facing away from the first magnet, wherein the first and second stators are preferably disposed between the first and second plate elements and the corresponding first and second magnets, respectively.

The first plate element is preferably arranged above the second plate element at a predetermined distance or is arranged at a predetermined distance from the second plate element.

The first and second stators, the first and second magnets and the first and second coils are preferably arranged in a space formed by the first and second plate elements.

The first and/or second plate element preferably has at least one air slot for preventing air compression in the space formed by the first and second plate elements.

Preferably, the device further comprises a third coil having a predetermined number of windings, wherein the third coil is arranged between the first magnet and the second magnet and at a predetermined distance from the first magnet.

Preferably, the third coil has an outer diameter that is smaller than the inner diameter of the first coil.

Preferably, the third coil has an outer diameter that essentially corresponds to an outer diameter of the second magnet.

Preferably, the device comprises only the second iron ring when the device comprises the third coil. In other words, it is preferred that the device has no first iron ring when the third coil is present.

Preferably, the third coil is arranged at least partially in one plane with the second iron ring.

Preferably, the windings of the third coil are wound in essentially parallel planes.

Preferably, the windings of the second coil are essentially contained in a surface that is perpendicular to the third coil.

Preferably, the device comprises, in addition to or instead of the third coil, a fourth coil having a predetermined number of windings, wherein the fourth coil is arranged above the first magnet. In other words, the fourth coil is arranged on the side of the first magnet facing away from the second magnet (i.e., the first magnet is located between the first and fourth coils).

Preferably, the fourth coil has an outer diameter that is larger than the outer diameter of the first magnet.

Preferably, the fourth coil has an outer diameter that is essentially the same as the outer diameter of the first coil.

Preferably, the windings of the second coil are essentially contained in a surface that is perpendicular to the fourth coil.

Preferably, the windings of the fourth coil are wound in essentially parallel planes.

Preferably, the windings of the fourth coil are essentially contained in a surface that is parallel to the third coil.

According to a further aspect of the present disclosure, a system, preferably a flooring system, for converting mechanical energy into electric energy and comprising at least one of the aforementioned devices is provided.

Various embodiments may preferably implement the following features.

Preferably, a plurality of the devices described above are arranged in a space which is formed by at least one side element, a floor element, and a cover element, wherein the plurality of devices are preferably arranged symmetrically in the space and wherein particularly preferably a first device is arranged centered in the space and further devices are arranged symmetrically around the first device in the space.

Preferably, the first stator has a shaft on the side facing away from the first magnet, which absorbs the acting force and thus moves the first stator together with the first magnet in the direction of the lower static second magnet.

The guidance of the shaft is preferably ensured by attaching an appropriate bearing.

Preferably, the bearing is held in position by a retaining ring.

The shaft together with the first stator and the first magnet preferably has a predetermined distance from the lower second magnet in the initial state.

The upper plate element (cover) additionally serves as a stop when the shaft is returned after force has been applied. Among other things, this prevents or abruptly stops the vibration that occurs after the force is applied.

The flooring system can also be referred to as a "Road Energy Production System" (REPS) and in one embodiment corresponds to an energy converter for roads/walkways. The embodiments are not limited to flooring systems. A person skilled in the art will understand that the devices described above can be used in various other energy harvesting systems, in particular in systems with linear movements or with forces acting perpendicularly to the device.

In particular, the devices described here are freely scalable in size and can therefore be installed in door handles, for example, in order to supply consumers (with low energy requirements) or in nacelles, for example, in order to tap their lost energy due to excessive vibrations.

Furthermore, the devices described here can be used in baffles that are subject to enormous wind forces caused by passing trains/cars, which can be tapped by the corresponding device.

Other possible applications are in fitness centers, for example, to tap linear forces or movements, e.g. when lowering the weight bench, the mechanism can absorb the weight force by swinging the barbell.

In particular, the embodiments of the disclosure described above provide a long service life of the device or system.

Roads are exposed to a lot of stress: They have to withstand both increasing traffic frequencies and ever heavier trucks—in heat, cold and rain. This is why integrable systems should be able to cope with this. The embodiments described here are advantageous for an enormously high load-bearing capacity and thus also technical service life for the following reasons, among others:

In principle, neodymium magnets have a long service life as long as they are not exposed to rust and the coercivity limit of the magnets is not exceeded. Through optimization, neodymium magnets can be insensitive to vibrations and have an optimized Curie temperature window (i.e., full magnetization at the maximum achievable ambient temperatures on the roads).

As the direct path from mechanical energy to electric energy is very short, no special mechanical configurations are required, which in turn extends the service life of the magnetic structure of the device.

As there is no mechanical load due to the magnetic structure of the device and the magnets do not touch each other, a low-friction (free) system can be provided, which again increases the service life of the system many times.

Figure 1B:
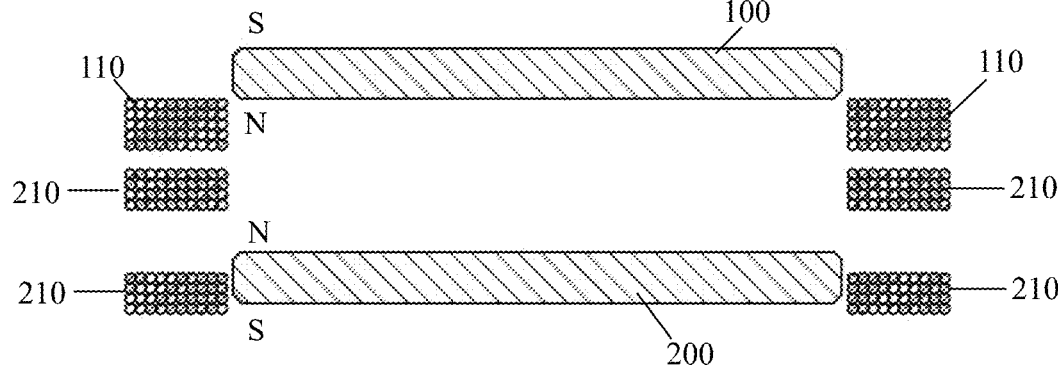
Figure 1C:
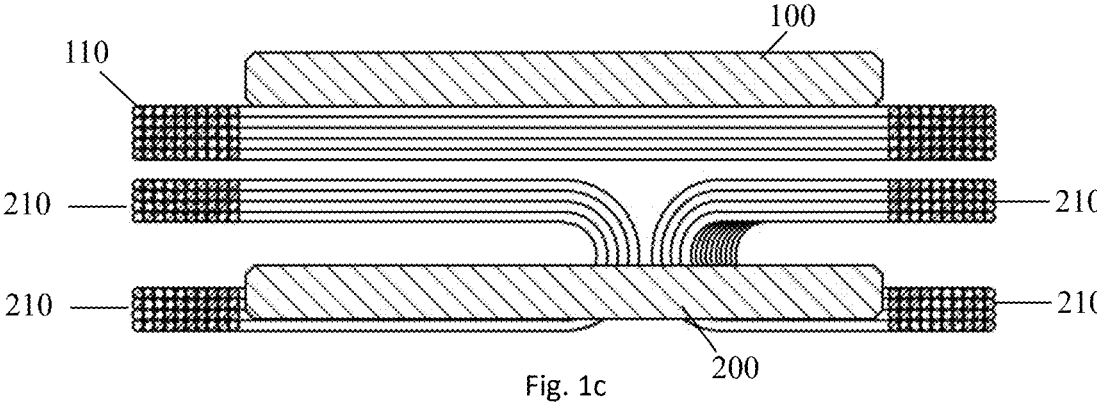
Figure 2A:
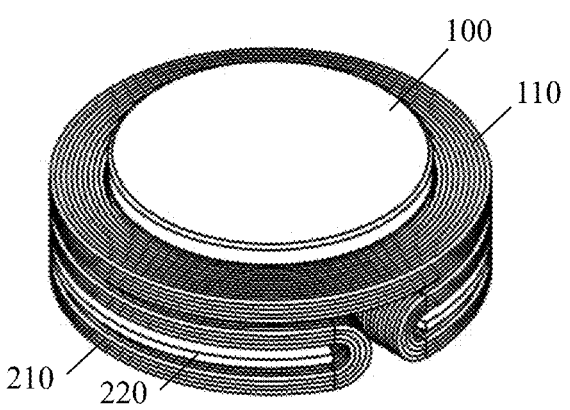
Figure 2B:
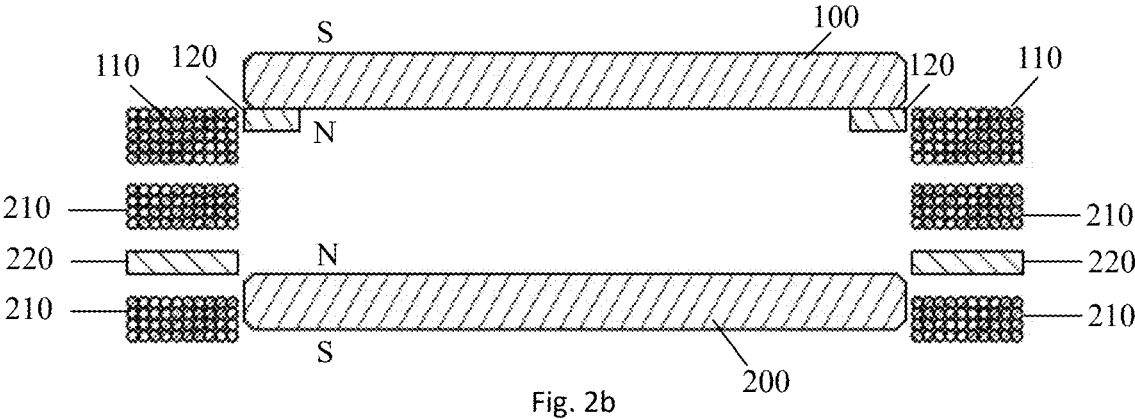
Figure 2C:
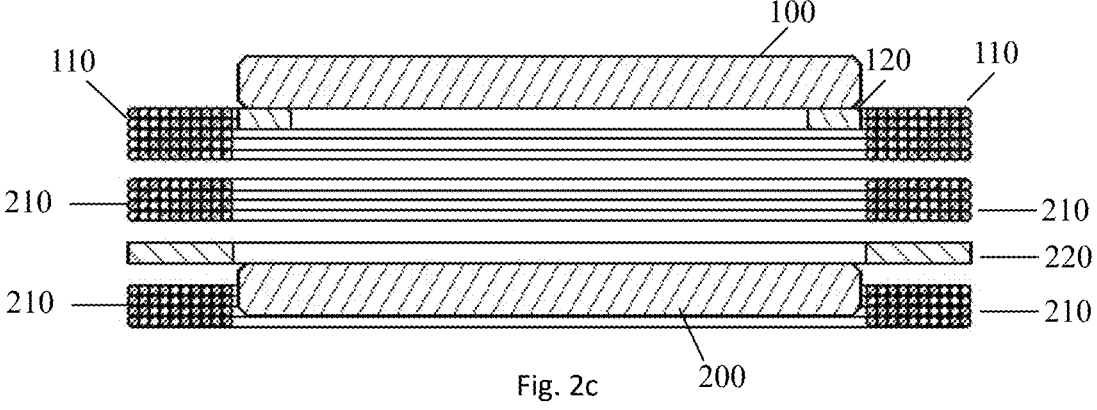
Figure 2D:
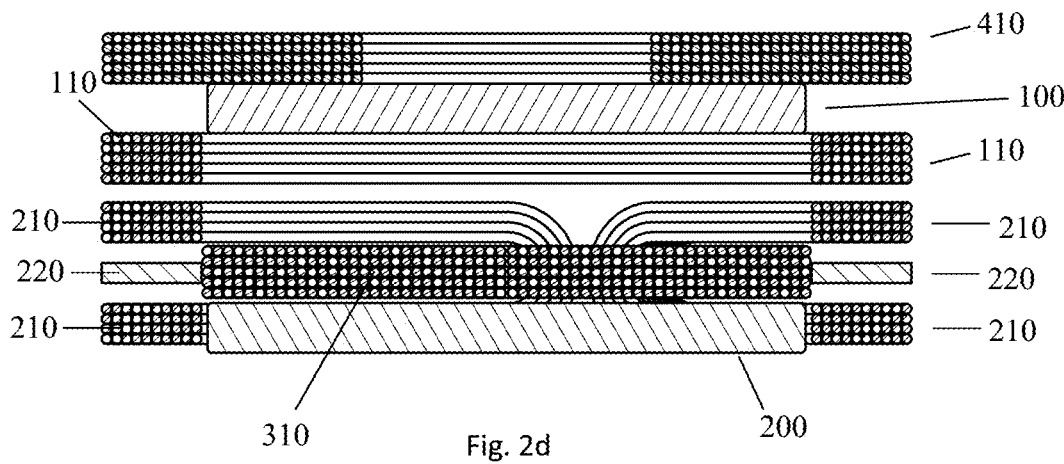
Figure 3:
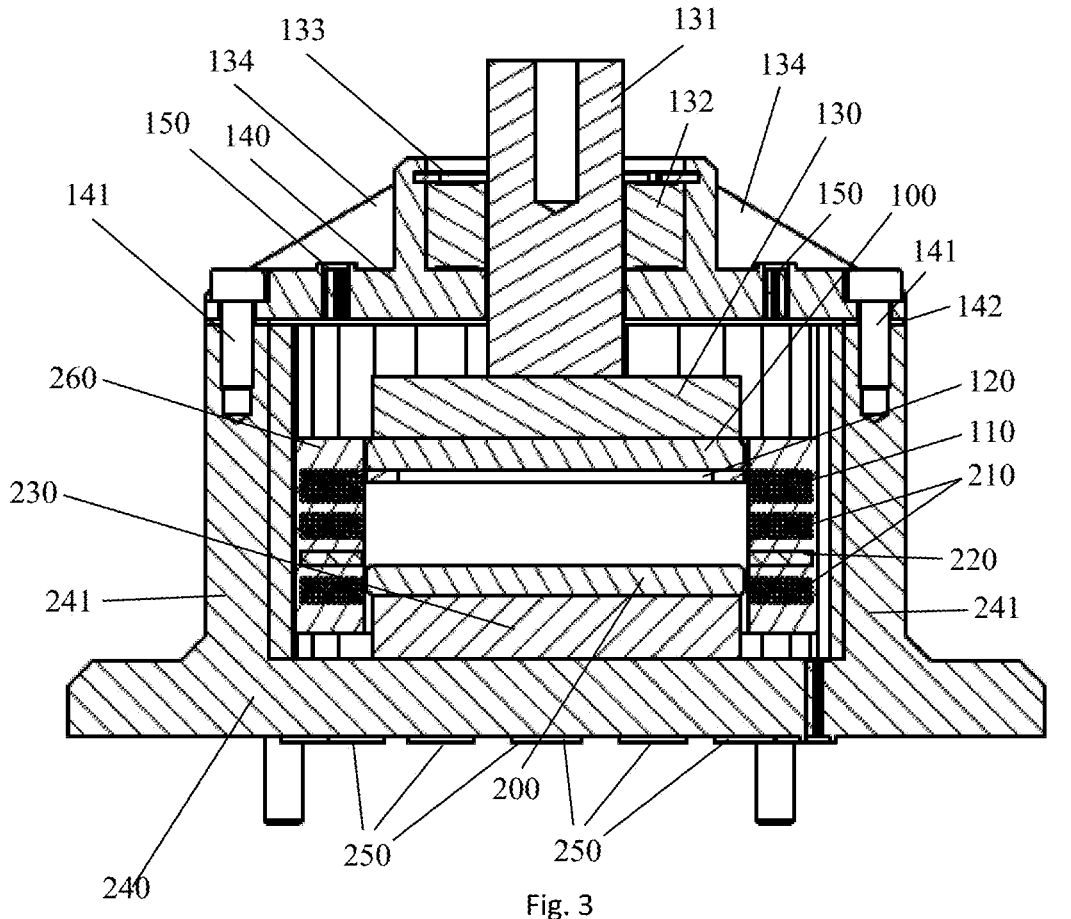
Figure 4A:
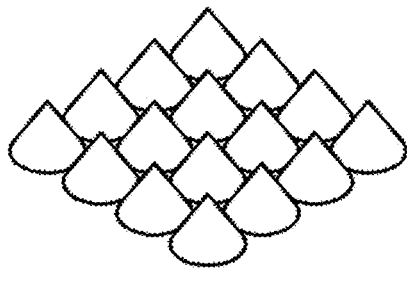
Figure 4B:
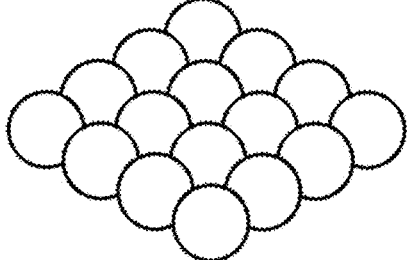
Figure 4C:
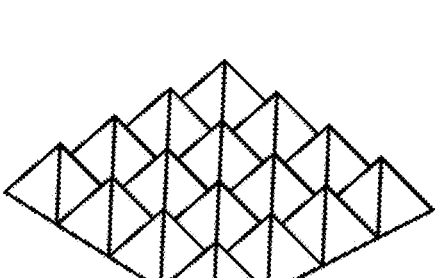
Figure 4D:
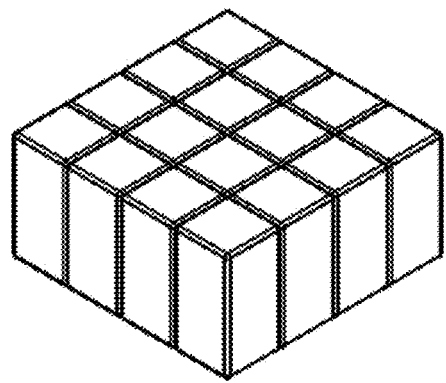
Figure 4E:
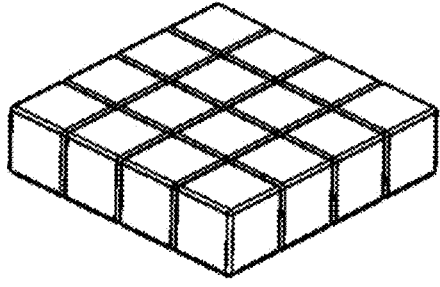
Figure 4F:
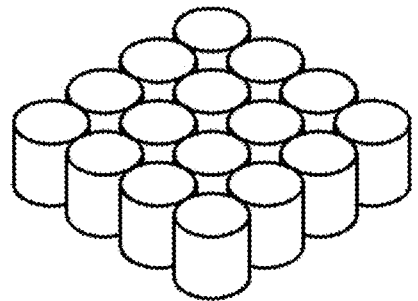
Figure 5:
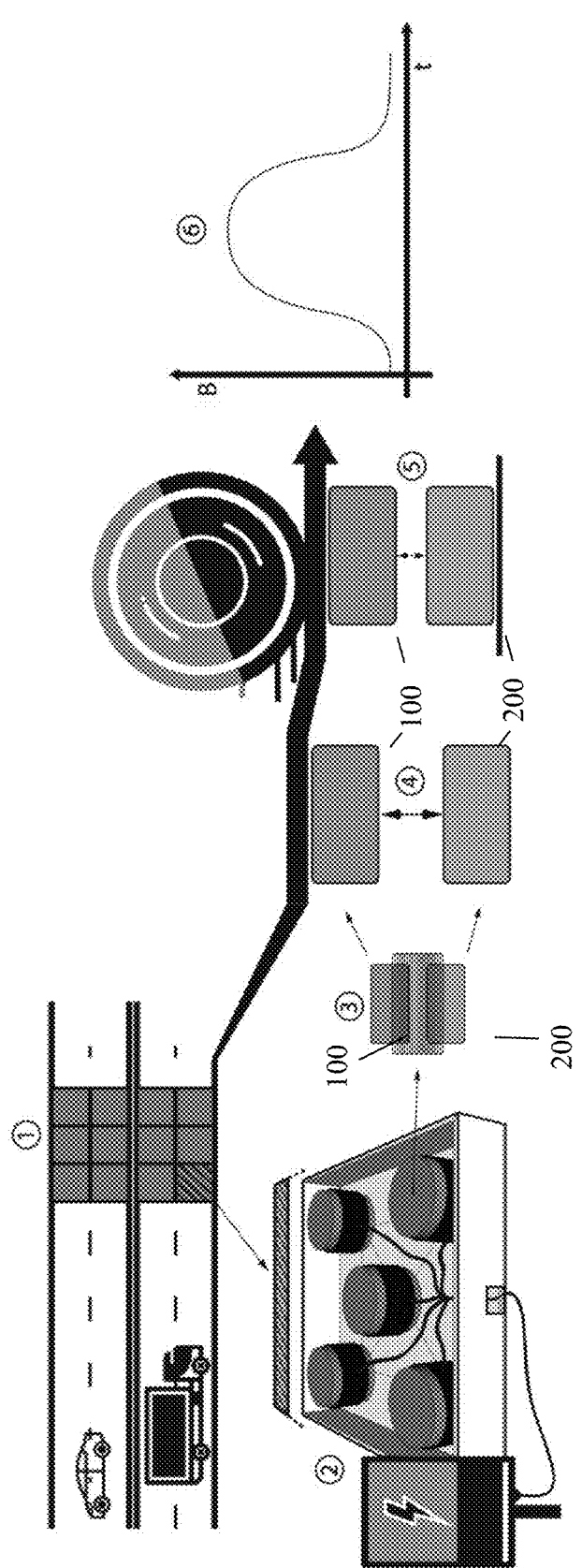
Figure 6:
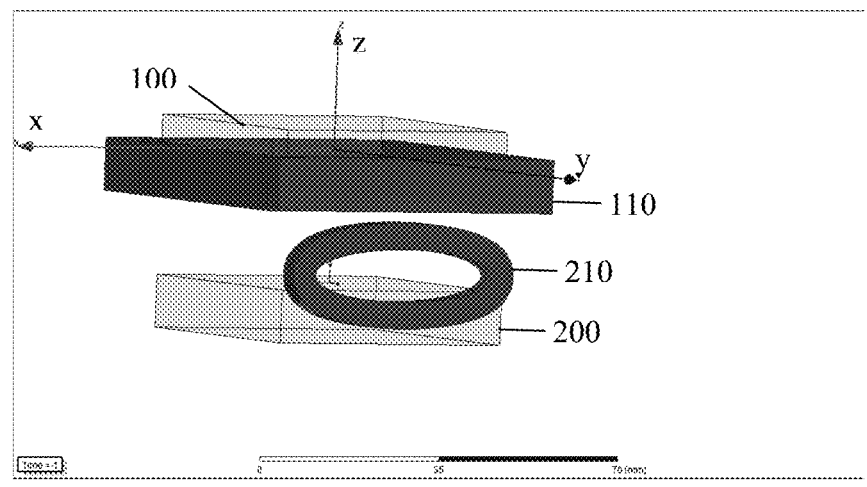
Figure 7A:
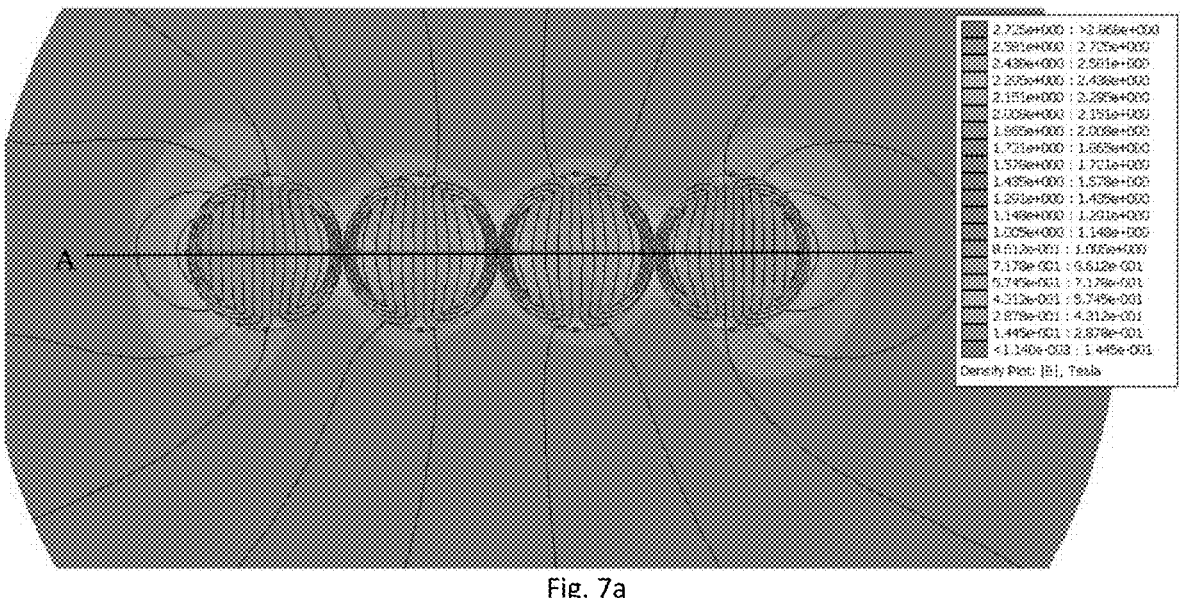
Figure 7B:
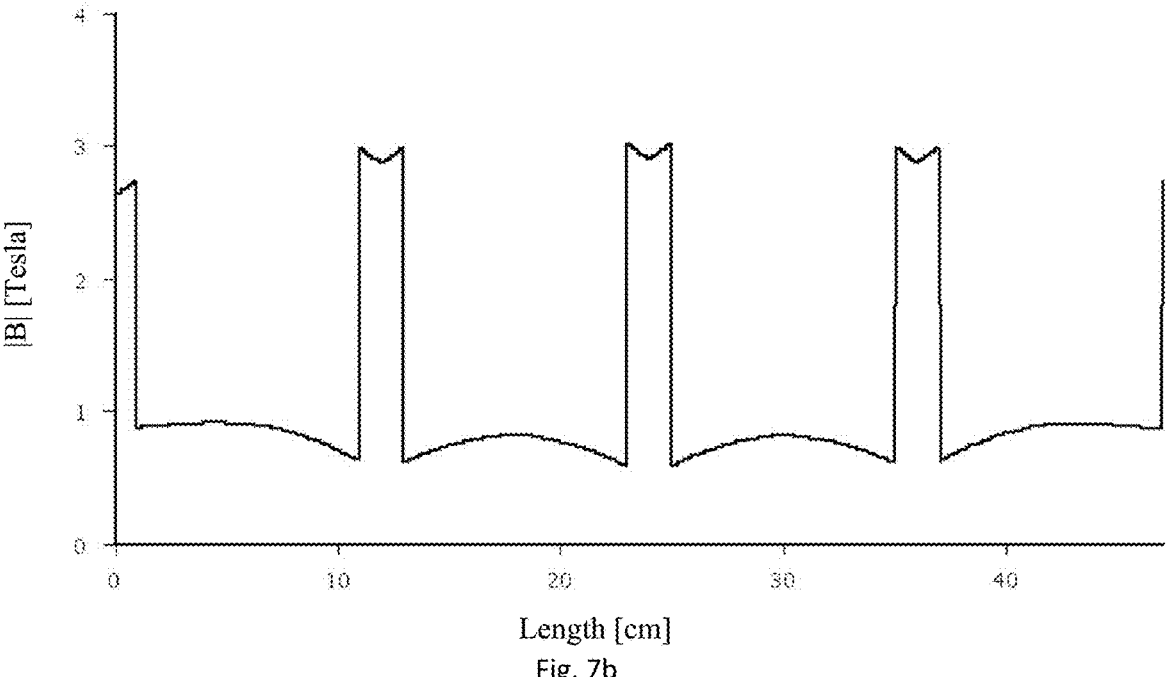
Figure 8A:
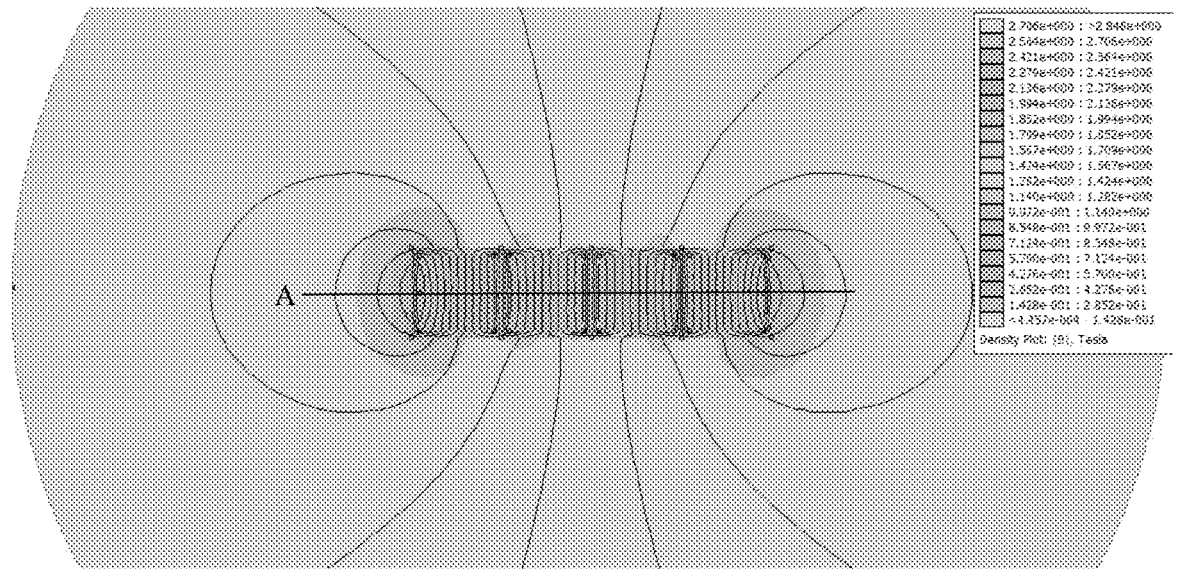
Figure 8B:
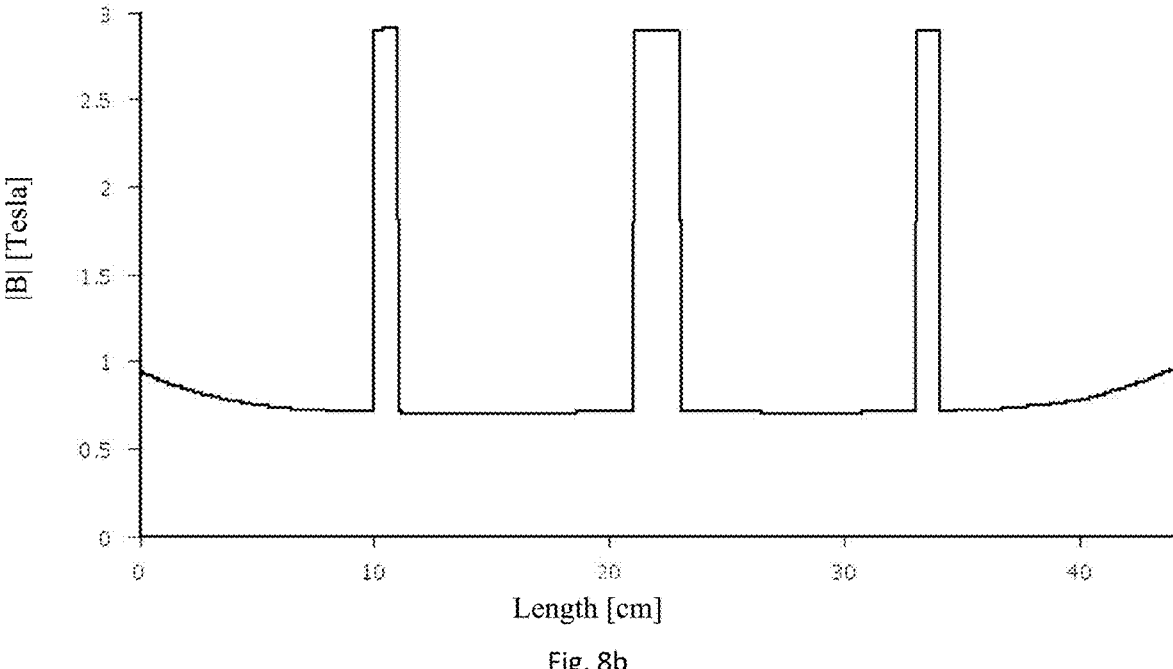

In the following, the above-mentioned aspects are explained in more detail on the basis of exemplary embodiments and the figures, wherein:

FIG. 1a shows a perspective view and a perspective sectional view of a device according to an embodiment of the disclosure, FIG. 1b shows a block diagram of a side sectional view of the device according to FIG. 1a, FIG. 1c shows a side sectional view of the device according to FIG. 1a, FIG. 2a shows a perspective view of a device according to an embodiment of the disclosure, FIG. 2b shows a block diagram of a side sectional view of the device according to FIG. 2a, FIG. 2c shows a side sectional view of the device according to FIG. 2a, FIG. 2d shows a side sectional view of the device according to a further embodiment of the disclosure, FIG. 3 shows a side sectional view of a device according to an embodiment of the disclosure, FIG. 4a shows a possible arrangement of cone magnets according to an embodiment of the disclosure, FIG. 4b shows a possible arrangement of sphere magnets according to an embodiment of the disclosure, FIG. 4c shows a possible arrangement of pyramid magnets according to an embodiment of the disclosure, FIG. 4d shows a possible arrangement of rectangular magnets according to an embodiment of the disclosure, FIG. 4e shows a possible arrangement of cube magnets according to an embodiment of the disclosure, FIG. 4f shows a possible arrangement of cylindrical magnets according to an embodiment of the disclosure, FIG. 5 shows a schematic sketch of a use of the device according to an embodiment of the disclosure, FIG. 6 shows a simulation setup of a device according to an embodiment of the disclosure, FIG. 7a shows a simulation of the magnetic field distribution in a device according to an embodiment of the disclosure, FIG. 7b shows the magnetic field distribution in a device according to an embodiment of the disclosure along line A in FIG. 7a, FIG. 8a shows a simulation of the magnetic field distribution in a device according to an embodiment of the disclosure, FIG. 8b shows the magnetic field distribution in a device according to an embodiment of the disclosure along line A in FIG. 8a.

FIG. 1a shows a perspective view and a perspective sectional view of a device according to an embodiment of the disclosure. FIG. 1b shows a block diagram of a side sectional view of the device according to FIG. 1a, and FIG. 1c shows a side sectional view of the device according to FIG. 1a.

As can be seen in FIGS. 1a-1c, a first magnet 100 is arranged at a predetermined distance above a second magnet 200. The first magnet 100 is arranged in a manner movable in the direction of the second magnet 200 and the same poles of the first magnet 100 and the second magnet 200 are aligned with each other. A north pole N and a south pole S are shown for each of first magnet 100 and second magnet 200.

In one embodiment, the second magnet 200 is installed in a fixed position.

Furthermore, a first coil 110 (toroidal coil) with a predetermined number of windings and an inner space formed by the windings is shown. The first coil 110 receives the first magnet 100 in its inner space during a movement in the direction of (i.e., toward) the second magnet 200, thereby generating a corresponding induction voltage.

A second coil 210 having a predetermined number of windings and an inner space formed by the windings is also shown. The second coil 210 is arranged below the first coil 110 and is aligned perpendicularly to the first coil 110 (i.e., the first col has a first col central axis C1 and the second coil has a second coil central axis C2, and the first coil and the second coil are arranged such that the first coil central axis C1 and the second coil central axis C2 are perpendicular to each other). The second coil 210 is arranged at least partially around the second magnet 200 and generates a voltage when the first magnet 100 moves in the direction of the second magnet 200.

The upper side of the first coil 110 is arranged substantially at the same height as the lower side of the first magnet 100. The first coil 110 has a shape corresponding to the first magnet 100 (here ring-shaped), wherein the inner diameter of the first coil 110 is larger than the outer diameter of the first magnet 100 to receive the first magnet 100 in the inner space (defined by the inner diameter) of the first coil 110 when the first magnet 100 is moved in the direction of the second magnet 200.

The second coil 210 has an elliptical shape. The second coil 210 is arranged around the second magnet 200 so that the ends (the two main vertices) of the elliptical second coil 210 are at a predetermined distance from each other and the first and second coils 110, 210 are aligned perpendicularly to each other.

The two main vertices of the second coil 210 lie in a plane parallel to the first and second magnets 100, 200.

One of the secondary vertices of the second coil 210 is arranged above the second magnet 200 and the other secondary vertex of the second coil 210 is arranged below the first secondary vertex, preferably at the level of the second magnet 200.

FIG. 2a shows a perspective view of a device according to an embodiment of the disclosure. FIG. 2b shows a block diagram of a side sectional view of the device according to FIG. 2a, and FIG. 2c shows a side sectional view of the device according to FIG. 2a.

The embodiment according to FIGS. 2a-2c essentially corresponds to the embodiment according to FIGS. 1a-1c. The features already described with reference to FIGS.

1a-1c will not be described again at this point. Only the additional features of the embodiment according to FIGS. 2a-2c are described below.

FIGS. 2a-2c show a first iron element 120, preferably a first steel element 120, and a second iron element 220, preferably a second steel element 220. The first iron element 120 has a shape corresponding to the first magnet 100 (here a ring shape) and is arranged below the first magnet 100. In other words, the first iron element 120 is arranged on the lower side of the first magnet 100 (the lower side corresponds to the side facing the second magnet 200) and is flush with the first magnet 100 on the outside.

The second iron element 220 has a shape that allows the second iron element 220 to be disposed in the inner space of the second coil 210 (inner space of the elliptical ring). In this embodiment, the second iron element 220 has a ring shape with a gap and is arranged in the inner space of the elliptical second coil 210, wherein the second iron element 220 extends from one main vertex to the other main vertex of the second coil 210 and the two main vertexes are located within the gap of the second iron element 220. The outer diameter of the second magnet 200 is smaller than the inner diameter of the second iron element 220.

The second iron element 220 is arranged above the second magnet 200, i.e. the upper side of the second magnet 200 (the upper side corresponds to the side facing the first magnet 100) is arranged below the lower side of the second iron element 220.

The inner and outer sides of the second iron element 220 are aligned with the inner and outer sides of the second coil 210. The second iron element 220 is arranged substantially centered in the inner space of the second coil 210.

The first and second iron elements 120, 220 are arranged in planes parallel to each other.

The upper iron element 120 has two functions. The first function is to reduce the repulsive force between the magnets. The upper dynamic magnet is now not only subject to a repulsive force from the lower static magnet, but also to an additional attractive force caused by the iron. The resulting force can now be calculated using a force equilibrium. This makes it possible to scale several modules inside the plate in order to increase the efficiency. In addition, the required repulsive force can be freely scaled by the thickness of the iron.

The second function of the inner steel ring is to bundle and displace the field lines outwards to the lower "repulsion coil". This allows noticeable voltages to be tapped.

The outer steel ring surrounded in the lower static magnet manages to drive the field line compression further outwards due to the repulsion and to bundle it in order to get closer with the coil. Without the lower steel ring, the physical effect would not be lost, but in practice it would be more difficult to tap the change in the magnetic field.

FIG. 2d shows a side sectional view of the device according to a further embodiment of the disclosure. Elements of the embodiment shown in FIG. 2d, which correspond to preceding embodiments, are provided with the same reference signs and a renewed description of these elements is dispensed with.

Compared to the embodiment of FIG. 2c, the embodiment of FIG. 2d has an additional third coil 310 and an additional fourth coil 410.

The third coil 310 is arranged between the first magnet 100 and the second magnet 200 and has a predetermined distance from the first magnet 100.

Further, the third coil 310 has an outer diameter that is smaller than the inner diameter of the first coil 110. Further, the third coil 310 has an outer diameter that is substantially equal to an outer diameter of the second magnet 200.

The distance between the third coil 310 and the second magnet 200 is minimal and the distance between the third coil 310 and the first magnet 100 is selected as a maximum, i.e. the distance between the third coil 310 and the second magnet 200 is significantly smaller than the distance between the third coil 310 and the first magnet 100.

Preferably, the device comprises only the second iron ring 220 when the device comprises the third coil 310. In other words, it is preferred that the device does not comprise a first iron ring 120 when the third coil 310 is present. However, the present disclosure is not limited to such a configuration and the first iron ring 120 may also be present in the embodiment of FIG. 2d.

In FIG. 2d, the third coil 310 is arranged at least partially in a plane with the second iron ring 220.

The windings of the third coil 310 are wound in substantially parallel planes and the windings of the second coil 210 are substantially contained in a surface that is perpendicular to the third coil 310.

The use of the third coil 310 offers a further increase in efficiency under a certain magnet geometry selection.

The third coil 310 shown here changes its added value depending on the dimensions of the surface and the height of the magnet (first magnet 100) moving on it. The use of the third coil 310 is particularly advantageous for magnet systems that have magnets 100, 200 with a great height and therefore a flux density that extends far downwards. This allows a long distance to be wound downwards.

The following table shows a percentage comparison of the three coils 110, 210 and 310 with regard to the respective energy yield. In particular, the table shows the respective percentage shares of the coils in the total energy yield. The designation N52 denotes the magnets used in this exemplary embodiment (neodymium magnets NdFeB N52). The present disclosure is of course not limited to the use of these magnets and the values listed in the table have been determined for systems with a third coil 310 (without a fourth coil 410) and without iron rings 120, 220. The values in the table may change due to the steel (depending on the thickness). The third coil 310 loses its added value as the thickness of the iron ring increases. When using a third coil 310 and a first iron ring 120, it is therefore advantageous to choose the thickness of the first iron ring 120 as small as possible.

| N52 | 70 × 40 mm | 25 × 20 mm | 150 × 40 mm |
|---|---|---|---|
| Second coil 210 | 12% | 91% | 5% |
| First coil 110 | 77% | 7% | 61% |
| Third coil 310 | 11% | 2% | 34% |

As can be seen in the table, the use of the third coil 310 is particularly suitable for very large magnets.

Furthermore, an additional fourth coil 410 is shown in FIG. 2d. The fourth coil 410 may be present in addition to or instead of the third coil 310.

The fourth coil 410 has a predetermined number of windings. The fourth coil 410 is arranged above the first magnet 100. In other words, the fourth coil 410 is arranged on the side of the first magnet 100 facing away from the second magnet 200 (i.e. the first magnet 100 is located between the first and fourth coils 110, 410).

The fourth coil 410 has an outer diameter that is larger than the outer diameter of the first magnet 100. Further, the fourth coil 410 has an outer diameter that is substantially equal to the outer diameter of the first coil 110.

As can be seen in FIG. 2d, the windings of the second coil 210 are substantially contained in a surface that is perpendicular to the fourth coil 410.

Further, the windings of the fourth coil 410 are wound in substantially parallel planes and the windings of the fourth coil 410 are substantially contained in a surface that is parallel to the third coil 310.

Compared to the third coil 310, the added value of the fourth coil 410 is similar to that of the third coil 310, with the difference that when a shaft (shaft 131 in FIG. 3 described below) is used, it passes through the fourth coil 410 to move the first magnet 100 downward. As a result, some tappable area may be lost in the fourth coil 410 compared to the third coil 310, where a magnetic field change occurs but no copper wire can be placed.

However, the fourth coil 410 can be wound higher than the third coil 310. With the third coil 310, this is blocked by the second magnet 200 and therefore only allows a certain winding height for the third coil 310. This is not the case with the fourth coil 410 and the fourth coil 410 can be wound further than the third coil 310.

Thus, the third coil 310 can be wound in such a way that a maximum tappable area is created. In other words, the third coil 310 can substantially completely enclose the corresponding copper wire (at least as far as technically possible). In other words, the copper wire of the third coil 310 substantially completely fills the inner space of the third coil.

Winding of the third coil 310 in the complete inner space of the third coil 310 is not possible in certain embodiments of the fourth coil 410, as described above, because, for example, a shaft (shaft 131 in FIG. 3 described below) is passed through the fourth coil 410 to move the first magnet 100. However, the fourth coil 410 can be wound further in height (perpendicular to the surface containing the windings of the fourth coil 410) compared to the third coil 310, as described above.

When multiple devices according to the present disclosure are used in a system according to the present disclosure, it may be advantageous to use a first number of devices having the first and second coils 110, 210 and a second number of devices having a first, a second and a third coil 110, 210, 310. In particular, the first and second magnets 100, 200 may be selected according to their size (large magnets for the use of three coils) in order to optimize cost and efficiency in such a mixed system.

FIG. 3 shows a side sectional view of a device according to an embodiment of the disclosure. The embodiment according to FIG. 3 essentially corresponds to the embodiment described above according to FIGS. 1a-1c and 2a-2c. The features already described with reference to FIGS. 1a-1c and 2a-2c will not be described again at this point. Only the additional features of the embodiment according to FIG. 3 are described below.

FIG. 3 shows a first stator 130 and a second stator 230. The first stator 130 is arranged on a side of the first magnet 100 facing away from the second magnet 200. The second stator 230 is arranged on a side of the second magnet 200 facing away from the first magnet 100.

FIG. 3 further shows a first plate element 140 and a second plate element 240. The first plate element 140 is arranged on a side of the first magnet 100 facing away from the second magnet 200. The second plate element 240 is arranged on a side of the second magnet 200 facing away from the first magnet 100.

The first and second stators 130, 230 are each arranged between the first and second plate elements 140, 240 and the corresponding first and second magnets 100, 200.

The first plate element 140 is arranged above the second plate element 240 at a predetermined distance.

The second plate element 240 has a vertical side element 241 which extends to the first plate element (cover) 140 and defines with the first plate element 140 a space in which the first and second stators 130, 230, the first and second magnets 100, 200 and the first and second coils 110, 210 are arranged.

The first plate element 140 is firmly connected to the vertical side element 241 of the second plate element 240 via at least one screw connection.

As can be seen in FIG. 3, the first and second plate elements 140, 240 extend parallel to each other. The side element 241 extends perpendicularly to the first and second plate elements 140, 240. As can be seen in FIG. 3, a shaft 131 is located above the stator 130, which in turn absorbs the acting force and thus moves the stator 130 together with the magnet 100 in the direction of the lower static magnet 200. The guidance of the shaft 131 is ensured by the attachment of a corresponding bearing 132. A retaining ring 133 in turn holds the bearing 132 in position.

The shaft 131 together with the stator 130 and the magnet 100 have a predetermined distance from the lower magnet 200 in the initial state. The upper plate element 140 (cover) also serves as a stop when the shaft 131 is returned after the force has been applied. Among other things, this prevents or abruptly stops the vibration that occurs after the application of force.

In one embodiment, the predetermined distance is 1-20 mm, preferably 1-10 mm.

The first and second plate elements 140, 240 have air slots 150, 250 which prevent air compression caused by the translational movement of the shaft 131 together with the stator 130 and the magnet 100. Fastening means are provided on the lower side of the second plate element 240 and on the shaft 131 to enable the device to be installed, for example, in a flooring system.

As described above, the device comprises a floor element (second plate element 240) and a top element (first plate element 140 or also cover element). The top element is firmly connected to the floor element or to the side element 241 via a corresponding screw connection 141. A flat seal 142 is inserted between the floor element 240 and the top element 140 to seal against moisture, for example.

Hexagon socket head cap screws are then used to fix the entire device (also known as the power module) to a base plate or floor construction (not shown) when used in a flooring system.

A shaft 131 is attached to the stator 130 of the upper magnet 100, which in turn is movably supported and thus enables a translatory movement in the vertical direction. The moving shaft 131 is guided by the bearing 132, which is fixed in the top element 140.

The bearing 132 is fixed by a retaining ring 133.

Additional rectangular struts 134 in the upper area of the top element are intended to additionally stabilize the support and ultimately the shaft 131 and reinforce the top element 140. This allows forces with a non-vertical orientation to be absorbed via the housing and dissipated accordingly.

The upper stator 130 together with the shaft 131 serves as a stop in conjunction with the top element 140 to suppress natural vibration behavior after deflection (the stator 130 is stopped abruptly by the top element 140).

The air slots 150, 250 in the floor element 240 and in the top element 140 serve to prevent the air compression inside the device when force is applied.

The first and second coils 110, 210, the first and second magnets 100, 200 and the first and second iron elements 120, 220 are preferably embedded in epoxy resin. Thus, the components can be effectively protected and positioned.

FIGS. 4a-4f show various arrangements of magnets that may be used for the first and/or second magnet 100, 200, respectively. In other words, the first and/or second magnet 100, 200 may consist of an arrangement of a plurality of magnets, wherein the plurality of magnets may be arranged as shown in FIGS. 4a-4f to form a respective first and/or second magnet 100, 200.

In particular, FIG. 4a shows a possible arrangement of cone magnets according to an embodiment of the disclosure. FIG. 4b shows a possible arrangement of sphere magnets according to an embodiment of the disclosure. FIG. 4c shows a possible arrangement of pyramid magnets according to an embodiment of the disclosure. FIG. 4d shows a possible arrangement of rectangular magnets according to an embodiment of the disclosure. FIG. 4e shows a possible arrangement of cube magnets according to an embodiment of the disclosure. FIG. 4f shows a possible arrangement of cylindrical magnets according to an embodiment of the disclosure.

The use of one of the aforementioned arrangements of multiple magnets to construct the first and/or second magnets 100, 200 may, among other things, reduce associated costs as opposed to the use of a single magnet 100, 200.

When using a single magnet, a coil with the cost y is wound around a single magnet with the cost z and the area x. If, for example, a coil is wound around four magnets placed together, the magnet price is 4z divided by 4 times the area 4x. The coil price, however, is not 4 times, but only 2y, as the optimum number of windings is not quadrupled. By substituting 4x into the formula described below, 16 times the power is also achieved. The fact that each magnet points north upwards means that there is a repulsive force between the individual magnets, which shortens the service life of the magnets.

Since the same effect can be achieved with sphere magnets as with cube magnets (see below), but a 10 mm diameter sphere magnet has a mass of 3.8 grams and a cube magnet has a mass of 7.6 grams and therefore ultimately less kilograms of neodymium are required and therefore lower costs are incurred for the system, the use of sphere magnets is advantageous when combining the magnets.

The function and use of the device described above are described in more detail below. FIG. 5 shows a schematic sketch of a mode of operation and use of the device according to an embodiment of the disclosure.

The basic principle is based on the conversion of mechanical energy into induction voltage. FIG. 5 illustrates the basic principle using a flooring system (in this case a road). As shown in FIG. 5 under point (1), the vertical weight force and the vertical force of motion (e.g. the mass of a car and its gravitational pull) are used to convert mechanical energy into electric energy.

Under point (2), FIG. 5 shows an exemplary arrangement of several devices as described above, which are arranged in a trough (here symmetrically) in order to compensate for torques. In this embodiment, four devices are arranged at the corners of a square and one device is centered in the square formed by the four devices. However, this is merely one of many ways of arranging the device(s) and the present disclosure is not intended to be limited thereto.

The mode of operation is outlined in more detail under points (3-6). The setup of the device described here causes the magnets 100, 200 to move relative to each other due to the weight of the vehicles passing over them, which in turn leads to a change in the magnetic fields. The resulting charge separation of the strong permanent magnets 100, 200 moves the charges in the surrounding wire coil and thus induces a voltage that generates a current flow through a consumer (induction voltage). The "repulsion coil" (second coil 210) is not visible in FIG. 5.

The induction voltages or induction currents described above are tapped in the form of intermediate storage, for example by capacitors. The induction currents can be rectified accordingly by a bridge circuit.

FIG. 6 shows a simulation setup of a device according to an embodiment of the disclosure. FIG. 6 shows the second coil 210 ("repulsion coil") as well as the first coil 110 ("induction coil") around a respective block magnet (first and second magnets 100, 200).

Thanks to the special arrangement described above, the 2-coil system makes it possible to tap a change in the magnetic field in both the horizontal and vertical directions. This allows the energy loss to be significantly minimized. The geometry of the first and second coils 110, 210 and magnets 100, 200 has been freely selected here in order to explain the principle in general.

A relatively high voltage can be induced by the repulsion of the magnets 100, 200. In the experimental setup, the repulsion coil 210 represents the lower coil 210 of the repelling magnet 200. Since the first coil 110 follows the induction voltage principle, the functional principle of the repulsion coil 210 shown here is also used in the embodiments described here.

The dynamics of the change in magnet position subsequently change the propagation of the magnetic field. As a result, the field lines become denser, and the entire magnetic field is pushed outwards. The outwardly pushed field lines thus allow an expansion of the 3-dimensional space, which can be tapped by coils.

With reference to the induction voltage equation, this not only means a significant change in the magnetic field and time, but also a significant increase in the areas that can be tapped by the coils. This in turn means that the repulsion of the magnetic poles not only causes the initial position to be reached, but also that additional energy is released that can be tapped.

The additional steel ring configuration allows the magnets to be designed only for the required repulsion.

https://www.supermagnete.at/scheibenmagnete-neodym/scheibenmagnet-45 mm-30 mm_S-45-30-N shows the attractive force of two neodymium 45 with a diameter of 45 mm and a height of 30 mm as a function of the distance. The repulsive force is approximately 90% of the attractive force. As a result, the system allows an increased repulsive force at smaller distances. This in turn means that up to a certain limit of the weight force, power is still generated by the repulsion coil 210 and therefore no energy is lost with larger masses.

Further, the first plate element 140 is returned to an initial position by the use of the first and second magnets 100, 200 without the use of a mechanical mechanism, such as a spring. The energy required in turn should in the best case be half of the energy achieved. The present embodiments allow additional energy to be generated by magnetic field changes when returning the first plate element 140. The only difference to downward movement is the negative sign in the voltage curve. This means that as long as the magnets are not damaged, more energy can be converted compared to any other energy converter.

The formula for calculating the final energy per device is as follows:

$$U = \left( \frac{\left( \frac{\left( N \times \frac{\Delta B \times A}{\Delta t} \right)^2}{R} \right) * t}{4} \right) * 2,$$

where N is the number of windings and B*A is the magnetic field change depending on the area, whereby the flux density value was always integrated here, as there are no localities for the flux density in an enclosed winding. Furthermore, t is the time of the magnet moving downwards (first magnet 100) and R is the resistance value of the windings in Ohms. The whole value is divided by 4, as only ¼ remains with the consumer. The whole value is multiplied by 2, as there is the path down and the path up.

In one embodiment, the system can also be designed such that the path down or the path up takes place faster/slower.

FIG. 7*a* shows a simple 2D simulation of a magnetic sphere assembly with an iron coating (N55-90° magnetized). FIG. 7*b* shows the integration thread (line A) through the sphere magnets.

FIG. 8*a* shows a simple 2D simulation of a magnetic cube assembly with an iron coating (N55-90° magnetized). FIG. 8*b* shows the integration thread (line A) through the cube magnets. The sphere magnets were used as an example to explain how much flux density can be achieved.

A possible magnetic field change of 0.9 Tesla can be read from the simulations. As it is not the volume but the area that plays a role in the formula, the smaller the point of the horizontal, the better, as this increases the delta B (magnetic field change).

Take the following values for the induction coil: A=0.0153 m^2, B=0.45 Tesla (here not 0.9 Tesla as shown in the simulation above, as with a 70 mm diameter, the magnet will take an area of 140 mm in order to wind as optimally as possible, with 1 cm path downwards). After integration, this results in 0.45 Tesla instead of 0.9 Tesla. The time t=0.0714 s is calculated from a force equilibrium of the magnetic repulsion and the counterforce by Lenz's rule.

The free fall for 1 cm without friction is defined as follows: 0.0345 s. The counterforce of the magnet results in the integrated 0.06 s for a path of 1 cm and the deceleration of the counteracting magnetic field caused by the current results in a time constant of 0.0714 s.

Furthermore, N=4000 windings are used, as this would be the optimum with a 0.3 mm wire and an area of 140 mm. This also results in a resistance value of 316 Ohms.

Energy induction coil theory: 5.26 joules with consumer and 21.06 joules without consumer.

The same calculation is made for the repulsion coil with the following values: B=2.5 T (where 2.5 T is a high value, but not unrealistic), A=0.00125 m ^2, t=0.005 s, N=555, R=71.284 Ohms. The difference here lies in the magnetic field change. Since the 2.5 Tesla change encompasses the complete windings and this magnetic field change follows a different physical principle, we do not need to integrate here.

In theory, the repulsion coil produces 4.2 joules with consumer and 16.8 joules without consumer.

The calculation therefore comes to 48.09 joules per module without consumer and power electronics (i.e. repulsion and induction coils). With consumer and power electronics, the calculation comes to 12 joules per module (device).

As the present embodiments function largely independently of mechanical power carriers (e.g. spindle for electric dynamo), the time constant can be kept very small. This means that, compared to other systems, this mechanism can generate more power with the same energy, i.e. the same mass, the same acceleration and the same path, as the time constant is not strongly influenced.

As the first magnet 100 moves linearly through the first coil 110, more area can be tapped as with a dynamo. For the same cost compared to such a dynamo-based system, approx. 32 modules (devices) can be installed. This achieves more than 60 times the energy. In order to increase the service life and make the mechanism largely maintenance-free, the present embodiments can preferably be designed for 74 joules, i.e. 15 times more than dynamo-based systems.

Although the present disclosure has been illustrated primarily with reference to flooring systems, particularly roads, the use of the devices described herein is not limited to this application. A person skilled in the art will understand that the devices described above can be used in various other energy harvesting systems, particularly systems involving linear motion. Non-exhaustive examples include, but are not limited to, highway baffles, door handles, etc.

Although the disclosure is illustrated and described in detail by means of the figures and the accompanying description, this illustration and detailed description are to be understood as illustrative and exemplary and not as limiting the disclosure. It is understood that those skilled in the art may make changes and modifications without departing from the scope of the following claims. In particular, the disclosure also includes embodiments with any combination of features mentioned or shown above with respect to various aspects and/or embodiments.

The disclosure also includes individual features in the figures, even if they are shown there in connection with other features and/or are not mentioned above.

Furthermore, the term "comprises" and derivatives thereof do not exclude other elements or steps. Likewise, the indefinite article "a" and derivatives thereof do not exclude a plurality. The functions of several features listed in the claims may be fulfilled by one unit. The terms "substantially", "about", "approximately" and the like in connection with a property or a value also define, in particular, also precisely the property or precisely the value. All reference signs in the claims are not to be understood as limiting the scope of the claims.

The invention claimed is:

1. A device for converting mechanical energy into electric energy, comprising:

a first magnet and a second magnet, wherein the first magnet is arranged apart from the second magnet at a predetermined distance and in a manner movable in a direction toward the second magnet, and wherein same poles of the first magnet and the second magnet face each other;

a first coil having a first plurality of windings that defines a first inner space, wherein the first coil is configured and arranged to receive the first magnet in the first inner space during a movement in the direction toward the second magnet and to generate a corresponding first induction voltage;

a second coil having a second plurality of windings that defines a second inner space, wherein the first coil has a first coil central axis at a center of the first coil and the second coil has a second coil central axis at a center of the second coil, wherein the first coil and the second coil are arranged such that the first coil central axis and the second coil central axis are perpendicular to each other, wherein the second coil is arranged at least partially around the second magnet and is configured to generate a second induction voltage when the first magnet moves toward the second magnet.

2. The device according to claim 1, further comprising a first stator arranged on a side of the first magnet facing away from the second magnet and a second stator arranged on a side of the second magnet facing away from the first magnet.

3. The device according to claim 1, wherein at least one of the first magnet and the second magnet has a cylindrical, rectangular, cubic, conical, spherical, or pyramidal shape.

4. The device according claim 1, further comprising:
a first iron element arranged below the first magnet; and
a second iron element arranged in the second inner space.

5. The device according to claim 4, wherein the first iron element is arranged on a side of the first magnet facing the second magnet and the first coil is configured to receive the first magnet and the first iron element in the first inner space during a movement in the direction of the second magnet.

6. The device according to claim 4, wherein at least one of (1) the first iron element has a ring shape and (2) the second iron element has a ring shape with a gap.

7. The device according to claim 1, wherein the first and second magnets are aligned with each other in an initial position corresponding to the predetermined distance.

8. The device according to claim 7, wherein the first and second magnets are adapted to move the first magnet in the direction of the second magnet when an external force is applied.

9. The device according to claim 7, wherein the first and second magnets are adapted to return to the initial position after an external force has been applied.

10. The device according to claim 2, further comprising a first plate element arranged on the side of the first magnet facing away from the second magnet and a second plate element arranged on the side of the second magnet facing away from the first magnet.

11. The device according to claim 10, wherein the first and second stators, the first and second magnets and the first and second coils are arranged in a space defined by the first and second plate elements.

12. The device according to claim 11, wherein at least one of the first and second plate elements comprises at least one air slot for preventing air compression in the space defined by the first and second plate elements.

13. The device according to claim 1, further comprising at least one of:
a third coil having a third plurality of windings, wherein the third coil is arranged between the first magnet and the second magnet and is disposed apart from the first magnet; and
a fourth coil having a fourth plurality of windings, wherein the fourth coil is arranged above the first magnet.

14. A flooring system comprising at least one device according to claim 1.

15. A flooring system, comprising:
at least one side element, a floor element, and a cover element; and
a plurality of devices according to claim 1, the plurality of devices arranged in a space which is formed by the at least one side element, the floor element, and the cover element.

16. The device according to claim 1, wherein the second coil is disposed below the first coil.

17. The device according to claim 4, wherein the first iron element is a first steel element, and the second iron element is a second steel element.

18. The device according to claim 5, wherein the first iron element is flush with an edge of the first magnet.

19. The device of claim 10, wherein the first and second stators are each arranged between the first and second plate elements, and the first stator is between the first plate element and the first magnet and the second stator is between the second plate element and the second magnet.

20. The device of claim 19, wherein the first plate element is arranged above the second plate element at a second predetermined distance.

* * * * *